US006710741B2

(12) United States Patent
Tucker

(10) Patent No.: US 6,710,741 B2
(45) Date of Patent: Mar. 23, 2004

(54) METHOD AND APPARATUS FOR DETERMINING POSITIONING RELATIVE TO UTILITY LINES

(75) Inventor: Layne Daniel Tucker, Grande Prairie (CA)

(73) Assignee: Guardian Angel Protection Inc., Grand Prairie (CA)

(*) Notice: Subject to any disclaimer, the term of this patent is extended or adjusted under 35 U.S.C. 154(b) by 0 days.

(21) Appl. No.: 10/160,941

(22) Filed: May 31, 2002

(65) Prior Publication Data

US 2003/0222815 A1 Dec. 4, 2003

(51) Int. Cl.[7] .............................. G01S 5/02; H04B 7/185
(52) U.S. Cl. .......................... 342/357.17; 342/357.09; 342/357.1; 37/348
(58) Field of Search ...................... 342/357.13, 357.17, 342/357.09, 357.1; 701/213; 37/348

(56) References Cited

U.S. PATENT DOCUMENTS

| | | | |
|---|---|---|---|
| 4,600,356 A | 7/1986 | Bridges et al. ............. 414/694 |
| 4,746,830 A | 5/1988 | Holland .................. 310/313 D |
| 4,755,805 A | 7/1988 | Chau ....................... 340/662 |
| 5,115,223 A | 5/1992 | Moody ...................... 340/573 |
| 5,198,800 A | 3/1993 | Tozawa et al. ............. 340/573 |
| 5,552,772 A | 9/1996 | Janky et al. ............... 340/573 |
| 5,576,972 A | 11/1996 | Harrison .................... 364/516 |
| 5,914,602 A | 6/1999 | Mercer ...................... 324/326 |
| 5,933,079 A | 8/1999 | Frink ........................ 340/539 |
| 5,964,298 A | 10/1999 | Greenspun ................. 172/4.5 |
| 6,003,376 A | 12/1999 | Burns et al. ................ 73/584 |
| 6,075,481 A | * 6/2000 | Eslambolchi et al. .. 342/357.08 |
| 6,100,806 A | 8/2000 | Gaukel ..................... 340/573.4 |
| 6,119,376 A | 9/2000 | Stump ........................ 37/348 |
| 6,191,585 B1 | 2/2001 | Mercer et al. ............... 324/326 |
| 6,218,945 B1 | 4/2001 | Taylor, Jr. ................ 340/573.1 |
| 6,246,932 B1 | 6/2001 | Kageyama et al. ........... 701/24 |
| 6,252,538 B1 | 6/2001 | Chignell ...................... 342/22 |
| 6,282,477 B1 | 8/2001 | Gudat et al. ................. 701/50 |
| 6,313,755 B1 | 11/2001 | Hetmaniak et al. ...... 340/856.3 |
| 6,477,795 B1 | * 11/2002 | Stump ........................ 37/348 |

OTHER PUBLICATIONS

Murray @ Work: Improving the Safety of Pipelines, 16 pages, http://www.senate.gov/~murray/pipelinemain.html.
Office of Pipeline Safety: Hazardous Liquid Pipeline Operators Accident Summary Statistics by Year, one page, http://ops.dot.gov/stats/lq_sum.htm.
Office of Pipeline Safety: Natural Gas Pipeline Operators Incident Summary Statistics by Year —Distribution Operators, one page, http://ops.dot.gov/stats/dist_sum.htm.
Office of Pipeline Safety: Natural Gas Pipeline Operators Incident Summary Statistics by Year —Transmission Operators, one page, http://ops.dot.gov/stats/tran_sum.htm.
Photocopy of International Search Report in PCT/CA02/00905, 3 pages, dated Dec. 6, 2002.

* cited by examiner

Primary Examiner—Theodore M. Blum
(74) Attorney, Agent, or Firm—Christensen O'Connor Johnson Kindness PLLC

(57) ABSTRACT

A method for determining positioning relative to utility lines. A first step involves providing a global positioning apparatus. A second step involves providing a processing unit with a display. The processing unit has stored in memory at least one geographical map depicting positioning of at least one utility line. A third step involves transferring data received from the global positioning apparatus to the processing unit and displaying on the display the positioning of the mobile machine relative to the at least one utility line on the at least one geographical map.

18 Claims, 3 Drawing Sheets

METHOD AND APPARATUS FOR DETERMINING POSITIONING RELATIVE TO UTILITY LINES

FIELD OF THE INVENTION

The present invention relates to a method and associated apparatus for determining positioning relative to utility lines and, in particular, the positioning of mobile groundbreaking equipment.

BACKGROUND OF THE INVENTION

There are millions of miles of utility lines buried in North America. These utility lines include: electric power lines, telephone lines, water lines, sewer lines, fibre-optic cable lines, natural gas transmission lines, natural gas distribution lines, and utility lines for transporting hazardous liquids. Every year incidents occur in which mobile groundbreaking equipment damage such utility lines.

Statistics kept by the United States Office of Pipeline Safety regarding pipelines indicate that between 1986 and 2001 there were 1286 incidents involving natural gas transmission lines, which killed 58 people, injured 217 people and caused 284 billion dollars in property damage. In that same period there were 2159 incidents involving natural gas distribution lines, which killed 282 people, injured 1264 people and caused 256 billion dollars in property damage. There were also 3034 incidents involving utility lines carrying hazardous liquids which killed 36 people, injured 244 people and caused a further 731 billion dollars in property damage. In order to understand the full impact of such incidents, one would have to also include environmental damage and economic loss as a result of a service disruption.

There have been previous attempts to address this problem, an example of which is U.S. Pat. No. 4,600,356 (Bridges et al 1986) entitled "Underground pipeline and cable detector and process". The teachings of the Bridges et al reference is to mount on a mechanical digging implement a metal detector capable of detecting underground conductive objects.

There are inherent problems in mounting a metal detector onto a metal machine. This has lead to a search for alternative technologies which will provide a more reliable result and also be capable of locating utility lines which are non-conductive.

SUMMARY OF THE INVENTION

What is required is a method and associated apparatus for determining positioning relative to utility lines.

According to one aspect of the present invention there is provided a method for determining positioning relative to utility lines. A first step involves providing a global positioning apparatus. A second step involves providing a processing unit with a display. The processing unit has stored in memory at least one geographical map depicting positioning of at least one utility line. A third step involves transferring data received from the global positioning apparatus to the processing unit and displaying on the display the positioning of the global positioning device relative to the at least one utility line on the at least one geographical map.

According to another aspect of the present invention there is provided an apparatus for determining positioning relative to utility lines. This apparatus includes a global positioning apparatus and a processing unit with a display. The processing unit has stored in memory at least one geographical map depicting positioning of at least one utility line. The processing unit receives data from the global positioning apparatus and displays on the display the positioning of the global positioning apparatus relative to the at least one utility line on the at least one geographical map.

With the method and apparatus, as described above, the accuracy of global positioning is coupled with the accuracy of utility line survey maps to give accurate real time data as to the positioning relative to the utility line. Although beneficial results can be obtained by a foreman walking on foot, it is envisaged that the global positioning apparatus and the processing unit will be mounted right on a mobile machine, so that the operator is always aware of the positioning of the mobile machine relative to the utility lines. It is, of course, preferable that all known utility lines be illustrated at the same time, to avoid any utility lines being damaged during construction. This would involve preparing a composite utility line survey map from individual utility line survey maps and displaying such composite utility line survey map.

Once the basic system is in place, there are a number of enhancements which may be added to the system. Even more beneficial results may be obtained when an operator alarm is in communication with the processing unit. The processing unit can then be programmed to trigger the operator alarm to alert an operator of the mobile machine should the mobile machine venture within a predetermined distance of a utility line.

A further hazard at construction sites is the safety of workers on foot who are working around the mobile machine. There are various alternative measures which can be taken to ensure the safety of such workers. One solution is to provide mobile global positioning apparatus which are carried by workers working in the vicinity of the mobile machine. The processing unit will receive signals from the mobile global positioning apparatus and display on the display the positioning of each worker relative to the mobile machine. An alternative solution is to provide a detector for detecting the presence of a worker within a predetermined distance of the mobile machine. The detector can be linked to the processing unit, with the processing unit being linked to the operator alarm to alert an operator of the presence of the worker. This alternative solution is less accurate as the operator will not know the precise position of the worker, but is a less expensive solution. It can be implemented through a variety of technologies, some of which include an infrared scanner which responds to heat, a visual scanner which responds to shadows, proximity sensors which respond to objects, a transmitter which interrogates a transponder carried by the worker, a transceiver which communicates with a transceiver carried by the worker, or a radio beacon detector which responds to a radio transmitter carried by the worker.

Even more beneficial results may be obtained when the processing unit has stored in memory for display, upon demand, critical data relating to each utility line. This critical data may include information as the nature of the utility line, ie. does it carry natural gas, telephone, or electrical power. The critical data may also include an emergency contact information of an owner of the utility line.

On large projects involving numerous mobile machines it may be desirable to have a central monitoring station. The central monitoring station will monitor the positioning of the mobile machine. The central monitoring station will receiving coordinate data via satellite or wireless communication from the global positioning apparatus mounted on the mobile machine. The central monitoring station will have a central processing unit with a central display. The processing unit will have stored in memory at least one geographical map depicting positioning of at least one utility line. The central monitoring station will receive data from the global positioning apparatus and display on the cental display the positioning of the mobile machine relative to the at least one utility line on the at least one geographical map. Two way communication will be provided between the central monitoring station and the mobile machine, so that the central monitoring station can communicate with the operator of the mobile groundbreaking machine, as required.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
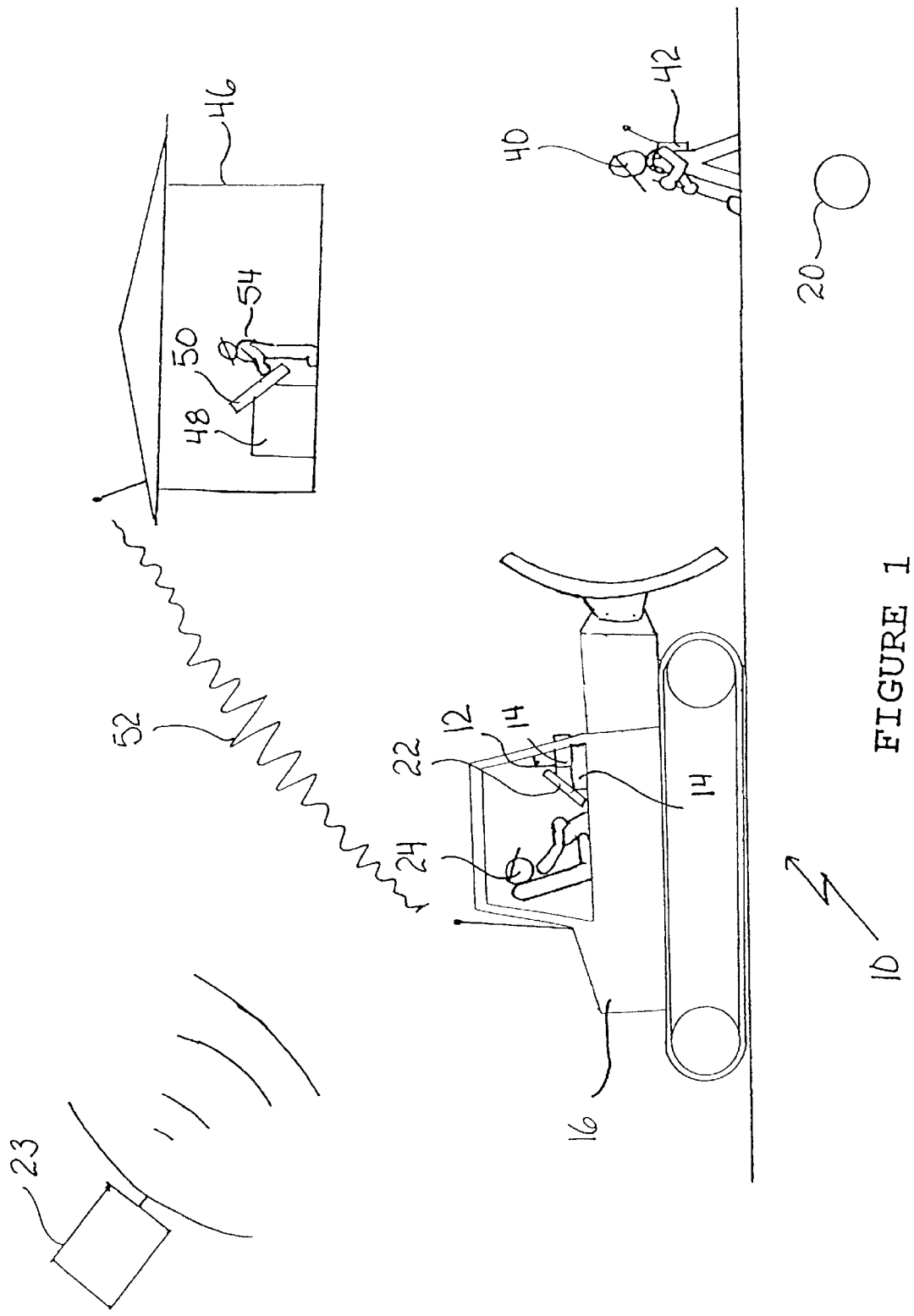
FIG. 1 is a side elevation view of an apparatus for determining positioning relative to utility lines in accordance with the teachings of the present invention.
Figure 2:
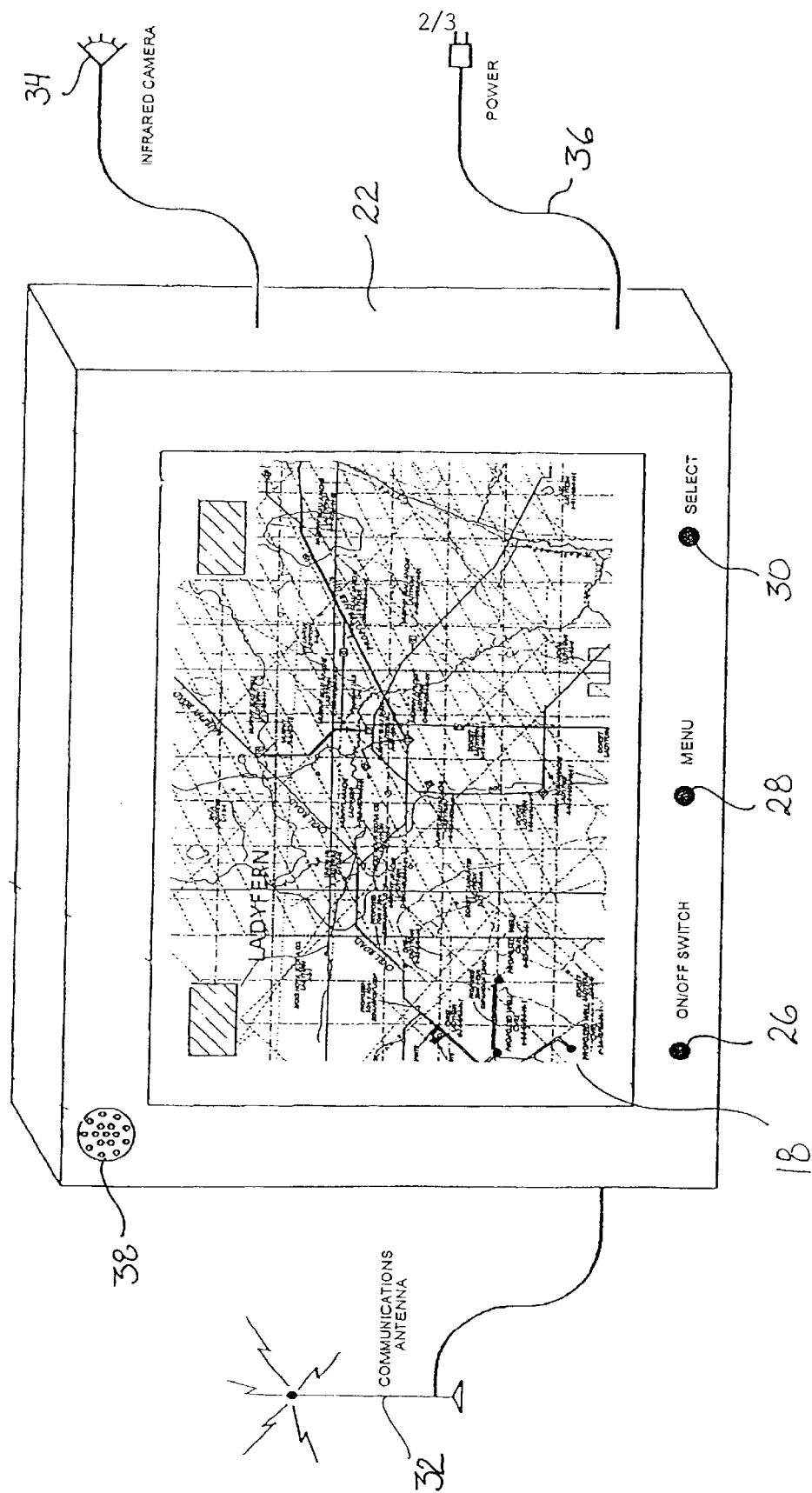
FIG. 2 is a detailed perspective view of the processing unit with display illustrated in FIG. 1.
Figure 3:
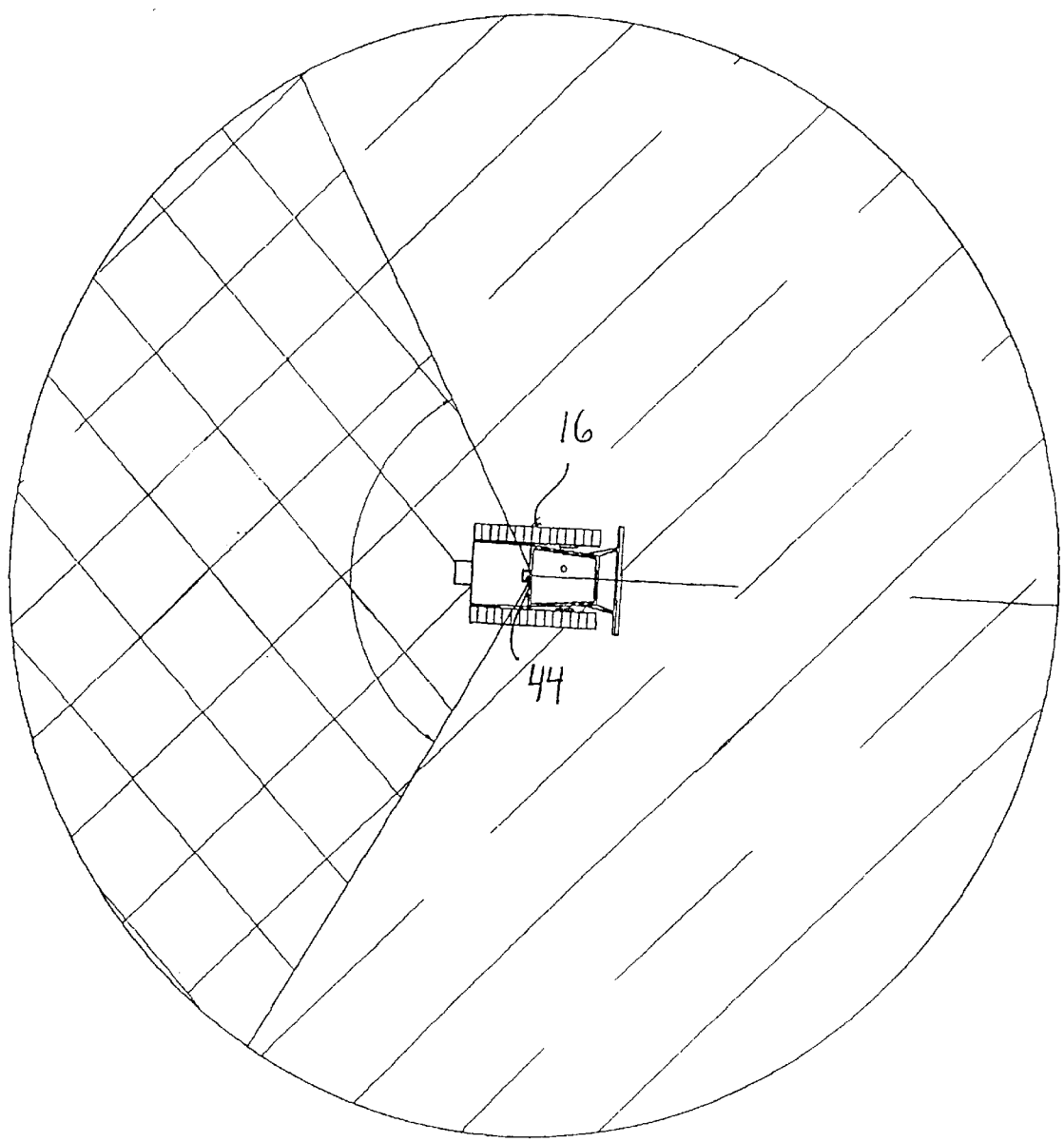
FIG. 3 is a top plan view of the mobile machine illustrated in FIG. 1.

The preferred embodiment, an apparatus for determining positioning relative to utility lines generally identified by reference numeral 10, will now be described with reference to FIGS. 1 through 3.
Structure and Relationship of Parts:

Referring to FIG. 1, apparatus 10 includes, in combination, a global positioning apparatus 12 and a processing unit 14. It is preferred, but not essential, that these be adapted for mounting on a mobile groundbreaking machine 16. Processing unit 14 has stored in memory a series of geographical maps 18 illustrated in FIG. 2. Referring to FIG. 2, maps 18 depicting positioning of all known utility lines 20, along with critical data relating to each of known utility lines 20, such as the nature of utility line 20 and emergency contact information of an owner. Referring to FIG. 1, processing unit 14 receives data from global positioning apparatus 12 and displays the positioning of mobile groundbreaking machine 16 relative to known utility lines 20 on one of series of geographical maps 18 illustrated in FIG. 2, on a display 22 which is mounted in mobile ground breaking machine 16. Display 22 is mounted in mobile ground breaking machine 16 in such a manner that it is viewable by an operator 24 of mobile ground breaking machine 16. Referring to FIG. 2, in the illustrated embodiment, display 22 includes a on/off switch 26, a menu button 28, and a selection button 30. A communications antenna 32 is connected to display 22 as well as an infrared camera 34, along with a power supply line 36. A operator alarm 38 is provided that is in communication with processing unit 14. In the illustrated embodiment, operator alarm 38 is an audible sound, however other types of alarms such as lights or signals could also be used. Referring to FIG. 1, processing unit 14 is programmed to trigger operator alarm 38 illustrated in FIG. 2, to alert operator 24 of mobile groundbreaking machine 16 should mobile groundbreaking machine 16 venture within a predetermined distance of one of known utility lines 20.

Operation:

The use and operation of the apparatus 10 will now be described with reference to FIGS. 1 through 3. Referring to FIG. 1, to use apparatus 10 as described above, global positioning apparatus 12 is mounted on mobile ground breaking machine 16. Processing unit 14 with display 22 as described above, is also mounted on mobile groundbreaking machine 16. Global positioning apparatus 12 generates a set of coordinates based upon global positioning data received via satellite 23. Data received from global positioning apparatus 12 is transferred to processing unit 14. Processing unit 14 has a relational database which enables it to display on geographical map 18 of display 22 the positioning of mobile groundbreaking machine 16 relative to utility lines 20, as illustrated in FIG. 2. Referring to FIG. 1, the accuracy of global positioning apparatus 12 coupled with the accuracy of utility line survey maps 18 illustrated in FIG. 2, give operator 24 of mobile groundbreaking machine 16 accurate real time data as to positioning of mobile groundbreaking machine 16 relative to utility line 20. Should mobile groundbreaking machine 16 venture within a predetermined distance of utility line 20, operator alarm 38 illustrated in FIG. 2, will trigger to alert operator 24 of mobile groundbreaking machine 16.

Variations:

Referring to FIG. 1, a further hazard at construction sites is the safety of workers 40 on foot who are working around mobile groundbreaking machine 16. There are various alternative measures which can be taken to ensure the safety of such workers 40. Apparatus 10 as described above can be used in conjunction with a mobile global positioning apparatus 42 that is carried by worker 40 working in the vicinity of mobile groundbreaking machine 16. Processing unit 14 receives signals from mobile global positioning apparatus 42 and displays on display 22 the positioning of worker 40 relative to mobile groundbreaking machine 16. Referring to FIG. 3, a detector 44 is provided that is mounted on mobile groundbreaking machine 16 for detecting the presence of worker 40 illustrated in FIG. 1, within a predetermined distance of mobile groundbreaking machine 16. Referring to FIG. 1, detector 44 is linked to processing unit 14 and processing unit 14 is linked to operator alarm 38 to alert operator 24 of the presence of worker 40. In the illustrated embodiment, detector 44 is an infrared scanner which responds to heat, however it will be appreciated that detector 44 could also be a visual scanner which responds to shadows, proximity sensors which respond to objects, a transmitter which interrogates a transponder carried by worker 40, a transceiver which communicates with a transceiver carried by worker 40, or a radio beacon detector which responds to a radio transmitter carried by worker 40.

Referring to FIG. 1, where several groundbreaking machines 16 are working on a construction project, a central monitoring station 46 can be provided to monitor the positioning of all mobile groundbreaking machines 16 working on a construction project. Central monitoring station 46 receives coordinate data via satellite or wireless communication from global positioning apparatus 12 mounted on each mobile groundbreaking machine 16. Central monitoring station 46 has a central processing unit 48 with a display 50. Processing unit 48 is similar to processing unit 14 as described above, in that processing unit 48 displays on display 50 the positioning of each of mobile groundbreaking machine 16 relative to known utility lines 20 on one of series of geographical maps 18 illustrated in FIG. 2. It is preferred that central monitoring station 46 be capable of identifying the type of mobile machine 16 (groundbreaking or not), the owner of the mobile machine and operator 24 of mobile machine 16. Referring to FIG. 1, two way communication 52 is provided between central monitoring station 46 and each mobile groundbreaking machine 16, such that a worker 54 monitoring display 50 can communicate with operator 24 of any of mobile ground breaking machines 16.

In the description above, the emphasis has been on groundbreaking machines. The reason for this is the most incidents involve buried utility lines whose location is not readily apparent. There are also a number of incidents which occur every year with overhead utility lines. It will appreciated that the system will also identify overhead utility lines. It will also be appreciated that the system can be used by a construction supervisor or foreman walking down a utility right of way on foot or can be mounted on any form of mobile machine. For example, the system could be placed in vehicles driven by the construction supervisor.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method for determining positioning relative to utility lines, comprising the steps of:
   providing a global positioning apparatus;
   providing a processing unit with a display, the processing unit having stored in memory at least one geographical map depicting positioning of at least one utility line; and
   transferring data from the global positioning apparatus to the processing unit and displaying on the display the positioning of the global positioning apparatus relative to the at least one utility line on the at least one geographical map;
   the global positioning apparatus and the processing unit being mounted on a mobile machine; and
   a central monitoring station to monitor the positioning of the mobile machine, the central monitoring station receiving data from the global positioning apparatus mounted on the mobile machine.

2. The method as defined in claim 1, the global positioning apparatus being incorporated into the processing unit.

3. The method as defined in claim 1, an operator alarm being in communication with the processing unit, the processing unit being programmed to trigger the operator alarm to alert an operator of the mobile machine should the mobile machine venture within a predetermined distance of a utility line.

4. The method as defined in claim 1, at least one mobile global positioning apparatus being provided which is adapted to be carried by a worker working in the vicinity of the mobile machine, the processing unit receiving signals from the at least one mobile global positioning apparatus and displaying on the display the positioning of the worker relative to the mobile machine.

5. The method as defined in claim 1, a detector being provided for detecting the presence of a worker within a predetermined distance of the mobile machine, the detector being linked to the processing unit, the processing unit being linked to an operator alarm to alert an operator of the presence of the worker.

6. An apparatus for determining positioning relative to utility lines, comprising:
   a global positioning apparatus;
   a processing unit with a display, the processing unit having stored in memory at least one geographical map depicting positioning of at least one utility line, the processing unit receiving data from the global positioning apparatus and displaying on the display the positioning of the global positioning apparatus relative to the at least one utility line on the at least one geographical map;
   the global positioning apparatus and the processing unit being mounted on a mobile machine; and
   a central monitoring station to monitor the positioning of the mobile machine, the central monitoring station receiving data from the global positioning apparatus mounted on the mobile machine.

7. The apparatus as defined in claim 6, wherein the global positioning apparatus being incorporated into the processing unit.

8. The apparatus as defined in claim 6, wherein an operator alarm is in communication with the processing unit, the processing unit being programmed to trigger the operator alarm to alert an operator of the mobile machine should the mobile machine venture within a predetermined distance of a utility line.

9. The apparatus as defined in claim 6, wherein at least one mobile global positioning apparatus is provided which is adapted to be carried by a worker working in the vicinity of the mobile machine, the processing unit receiving signals from the at least one mobile global positioning apparatus and displaying on the display the positioning of the worker relative to the mobile machine.

10. An apparatus for determining positioning relative to utility lines, comprising:
    a global positioning apparatus;
    a processing unit with a display, the processing unit having stored in memory at least one geographical map depicting positioning of at least one utility line, the processing unit receiving data from the global positioning apparatus and displaying on the display the positioning of the global positioning apparatus relative to the at least one utility line on the at least one geographical map;
    an operator alarm in communication with the processing unit; and
    a detector for detecting the presence of a worker within a predetermined distance of the mobile machine, the detector being linked to the processing unit, the processing unit being linked to the operator alarm to alert an operator of the presence of the worker.

11. The apparatus as claimed in claim 9, the detector being one of an infrared scanner which responds to heat, a visual scanner which responds to shadows, proximity sensors which respond to objects, a transmitter which interrogates a transponder carried by the worker, a transceiver which communicates with a transceiver carried by the worker, or a radio beacon detector which responds to a radio transmitter carried by the worker.

12. The apparatus as defined in claim 6, wherein the processing unit has stored in memory for display, upon demand, data relating to each of the at least one utility line, including the nature of the utility line and an emergency contact information of an owner.

13. The apparatus as defined in claim 6, where the at least one geographical map depicts positioning of all known utility lines in the vicinity.

14. The apparatus as claimed in claim 7, wherein the central monitoring station has a central processing unit with a central display, the processing unit having stored in memory at least one geographical map depicting positioning of at least one utility line, the central monitoring station receiving data from the global positioning apparatus and displaying on the central display the positioning of the mobile machine relative to the at least one utility line on the at least one geographical map, two way communication being provided between the central monitoring station and the mobile machine.

15. An apparatus for determining positioning relative to utility lines, comprising in combination:

- a global positioning apparatus adapted for mounting on a mobile machine;
- a processing unit with display adapted for mounting on the mobile machine, the processing unit having stored in memory a series of geographical maps depicting positioning of all known utility lines, along with data relating to each of the known utility lines, including the nature of the utility line and an emergency contact information of an owner, the processing unit receiving data from the global positioning apparatus and displaying on the display the positioning of the mobile machine relative to the known utility lines on one of the series of geographical maps;
- an operator alarm in communication with the processing unit, the processing unit being programmed to trigger the operator alarm to alert an operator of the mobile machine should the mobile machine venture within a predetermined distance of one of the known utility lines; and
- a detector being mounted on the mobile machine for detecting the presence of a worker within a predetermined distance of the mobile machine, the detector being linked to the processing unit, the processing unit being linked to the operator alarm to alert an operator of the presence of the worker.

16. The apparatus as defined in claim 15, wherein at least one mobile global positioning apparatus is carried by a worker working in the vicinity of the mobile machine, the processing unit receiving signals from the at least one mobile global positioning apparatus and displaying on the display the positioning of the worker relative to the mobile machine.

17. The apparatus as claimed in claim 15, wherein the detector is one of an infrared scanner which responds to heat, a visual scanner which responds to shadows, proximity sensors which respond to objects, a transmitter which interrogates a transponder carried by the worker, a transceiver which communicates with a transceiver carried by the worker, or a radio beacon detector which responds to a radio transmitter carried by the worker.

18. The apparatus as claimed in claim 15, wherein there is provided a central monitoring station to monitor the positioning of all mobile machines working on a construction project, the central monitoring station receiving data from the global positioning apparatus mounted on each mobile machine, the central monitoring station having a central processing unit with a display, the processing unit having stored in memory a series of geographical maps depicting positioning of all known utility lines, along with data relating to each of the known utility lines, including the nature of the utility line and an emergency contact information of an owner, the processing unit receiving data from each global positioning apparatus and displaying on the display the positioning of each of the mobile machine relative to the known utility lines on one of the series of geographical maps, two way communication being provided between the central monitoring station and each mobile machine.

* * * * *

UNITED STATES PATENT AND TRADEMARK OFFICE
CERTIFICATE OF CORRECTION

PATENT NO. : 6,710,741 B2
DATED : March 23, 2004
INVENTOR(S) : L.D. Tucker

It is certified that error appears in the above-identified patent and that said Letters Patent is hereby corrected as shown below:

<u>Title page,</u>
Item [30], Foreign Application Priority Data, insert in appropriate order:

-- [30]    Foreign Application Priority Data

Apr. 12, 2002          (CA)         2381674 --.

Signed and Sealed this

Tenth Day of August, 2004

JON W. DUDAS
*Acting Director of the United States Patent and Trademark Office*